United States Patent

Pohl et al.

[11] Patent Number: 5,181,891
[45] Date of Patent: Jan. 26, 1993

[54] DRIVE DEVICE FOR AN ADJUSTABLE PART OF A VEHICLE

[75] Inventors: Peter Pohl, Krailling; Reinhold Gruber, Stockdorf, both of Fed. Rep. of Germany

[73] Assignee: Webasto AG Fahrzeugtechnik, Stockdorf, Fed. Rep. of Germany

[21] Appl. No.: 727,627

[22] Filed: Jul. 10, 1991

[30] Foreign Application Priority Data

Jul. 10, 1990 [DE] Fed. Rep. of Germany ....... 4021973

[51] Int. Cl.[5] .............................................. B60J 7/04
[52] U.S. Cl. .................................... 475/162; 296/223
[58] Field of Search .................... 74/89.14, 89.22; 475/162, 176, 177; 192/139; 296/223

[56] References Cited

U.S. PATENT DOCUMENTS

| | | | |
|---|---|---|---|
| 1,759,062 | 5/1930 | Neighbour | 475/162 X |
| 2,713,971 | 7/1955 | Bud et al. | 475/162 X |
| 4,420,185 | 12/1983 | Bienert et al. | 296/223 |
| 4,425,825 | 1/1984 | Chambers et al. | 475/162 |
| 4,468,063 | 8/1984 | Yukimoto et al. | 296/223 |
| 4,561,691 | 12/1985 | Kawai et al. | 296/216 |
| 4,659,141 | 4/1987 | Masuda et al. | 296/223 |
| 4,893,870 | 1/1990 | Moriya et al. | 296/223 |

FOREIGN PATENT DOCUMENTS

| | | |
|---|---|---|
| 7629034 | 3/1978 | Fed. Rep. of Germany. |
| 3013304 | 10/1981 | Fed. Rep. of Germany. |
| 3823869 | 1/1990 | Fed. Rep. of Germany. |
| 772653 | 11/1934 | France ........... 475/162 |
| 797130 | 4/1936 | France ........... 475/162 |
| 330468 | 8/1938 | Italy ............. 475/162 |
| 41179 | 12/1970 | Japan ............ 475/162 |
| 226326 | 10/1986 | Japan ............ 296/223 |
| 34224 | 2/1988 | Japan ............ 296/223 |
| 37510 | 10/1906 | Switzerland ..... 475/162 |

Primary Examiner—Leslie A. Braun
Assistant Examiner—Khoi Q. Ta
Attorney, Agent, or Firm—Sixbey, Friedman, Leedom & Ferguson

[57] ABSTRACT

Drive device for a vehicle part that is displaceable between end positions, with an electric motor connected by a reduction gear to a driving pinion which is connected to the vehicle part so as to drive it, as well as with a switching device for controlling the motor to stop the motor in at least one predetermined position of the vehicle part. To actuate the switching device there is a switch wheel which, during displacement of the vehicle part between its end positions, is rotated less than 360° by an eccentric gear train. The eccentric gear train has an external gear with an internal toothing coaxial to a common shaft of the reduction gear and the eccentric gear train, an eccentric disk that is connected to the common shaft in a manner precluding relative rotation between the eccentric disk, and an internal gear with an external toothing that meshes with the internal toothing of the external gear. The internal gear is supported on the eccentric disk for relative rotation between the internal gear and the eccentric disk. The internal gear is prevented from rotating relative to the external gear and is guided for movement back and forth along an adjusting axis that is normal to the axial direction of the shaft. The external gear is connected to the switch wheel to rotate with it.

20 Claims, 6 Drawing Sheets

DRIVE DEVICE FOR AN ADJUSTABLE PART OF A VEHICLE

BACKGROUND OF THE INVENTION

The invention relates to a drive device for a vehicle roof cover that can be adjusted between end positions, with an electric motor that is connected by a reduction gear to a driving pinion located on a drive shaft, a driving pinion which is connected to the vehicle part so as to drive it, as well as to a switching device controlling the motor to stop the motor in at least one predetermined position of the vehicle part. More specifically, the invention relates to such a drive device where a switch wheel is provided to actuate the switching device, and during adjustment of the vehicle part between its end positions, an eccentric gear train causes the switch wheel to rotate less than 360°, the eccentric gear train having an external gear with an internal toothing, that is coaxial to a common shaft of the reduction gear and eccentric gear train, and an internal gear that has an external toothing meshed with the internal toothing and at least one tooth less than the external gear, and that is supported on an eccentric disk that is connected to the shaft in a manner permitting relative rotation between the internal gear and eccentric disk.

In known drive devices of this type U.S. Pat. No. 4,468,063, U.S. Pat. No. 4,659,141 and U.S. Pat. No. 4,561,691, the external gear of the eccentric gear train is integrally connected with a transmission housing part; in particular, it is formed on the transmission housing part. When the eccentric disk rotates, the internal gear is caused to rotate relative to the external gear. During this rotation, the switch wheel is slaved by a pin that is attached to the internal gear and that engages in a radial slot of the external gear to allow the rotation of the internal gear. When the connection between the relevant transmission housing part and the external gear is of a one-piece construction, the combination of transmission housing part and external gear represents a relatively expensive precision component. If the transmission housing part and the external gear are manufactured as separate components, an overall multipart drive device results, whose assembly is relatively expensive.

In other known drive devices for adjustable covers of vehicle roofs (Gebrauchsmuster 76 29 034 and U.S. Pat. No. 4,420,185), a stepping gear is provided instead of an eccentric gear train. But for the purpose at hand, suitable stepping gears require expensive, highly precise components. Tolerances for the gears are strict. Further, during operation, undesired clicking noises result because of intermittent tooth engagement.

SUMMARY OF THE INVENTION

The object of the invention is to provide a drive device of the above-mentioned type that operates with little noise and that can be assembled with relatively few and comparatively simple individual parts.

Starting from a drive device of the above-mentioned type, this object is achieved according to the invention by preventing the internal body external gear from rotating relative to the outer external body internal gear and by guiding the internal gear back and forth along an adjusting axis that intersects the axis of the shaft, as well as by connecting the external gear to rotate with the switch wheel.

The drive device according to the invention makes do with a simplified transmission housing. In particular, it is not necessary to form an external gear on a transmission housing part or to integrally connect such a transmission housing part to an external gear.

In another configuration of the invention, the external body gear itself forms the switch wheel.

A stationary guide bolt that movably engages in a radial recess of the internal body external gear can simply be provided to guide the internal body external gear, and the guide bolt, suitably, is attached to the transmission housing part, such as by being an integrally cast part of a transmission housing part that is made as a cast part.

The radial recess can be made radially inside of the toothing of the internal body external gear or in a part of the internal body external gear which projects radially outward beyond this toothing. In the latter case, the radial recess can have the shape of an oblong hole or of a radially outwardly open slot.

Advantageously, the number of teeth of the external body gear is precisely one more than the number of teeth of the internal body external gear. In this way, it is assured that, regardless of the mutual angular orientation at which the internal and external gears are put together during assembly, the switch wheel is correctly coordinated with the switching device.

The reduction gear, advantageously, can comprise a worm-gear shaft driven by the motor and a worm wheel that meshes with it, is located on the common shaft of the reduction gear and the eccentric gear train, and is connected to rotate with this shaft. Thus, the number of components required, overall, is kept especially small when the eccentric disk is formed on the worm wheel.

The common shaft of the reduction gear and eccentric gear train can, also, form the drive shaft carrying the driving pinion. In this way, the overall arrangement makes do with an especially small installation space and the number of individual parts is further reduced.

The switch wheel can be made as a cam wheel and can be provided with several cam tracks that are mutually offset in the axial direction, so that each track interacts with a respective switch of the switching device, for example, to stop the cover of a vehicle roof in one end position as well as in the other.

The switch wheel can, also, carry at least one permanent magnet to actuate the switching device by interacting with at least one magnetic field sensor. Preferably, a Hall sensor is used for this purpose.

Also, the internal and external gear are made of materials with at least approximately equal coefficients of thermal expansion. This guarantees a perfect operation of the drive device within an especially wide temperature range.

These and other objects, features and advantages of the invention will become apparent from the following detailed description of the preferred embodiments when viewed in conjunction with the accompanying drawings.

DETAILED DESCRIPTION OF THE PREFERRED EMBODIMENTS

Figure 1:
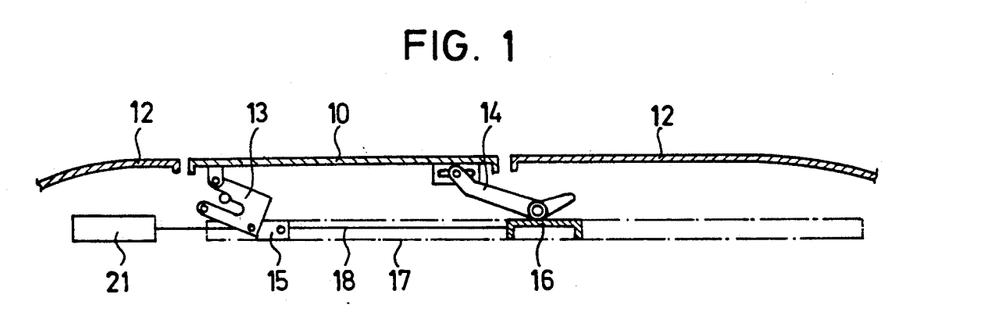
FIG. 1 is a diagrammatic longitudinal section of a vehicle sliding roof with a cover in a closed position.
Figure 2:
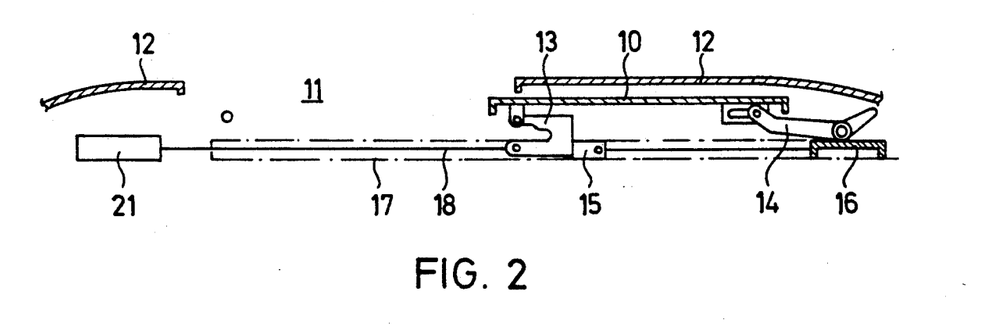
FIG. 2 is a view of the roof corresponding to that of FIG. 1 but with the cover shown in an open position.

The vehicle sliding roof illustrated in FIGS. 1 and 2 has a cover 10 that closes a roof opening 11 made in a stationary roof surface 12 in the position shown in FIG. 1. Each side of cover 10 is supported on a front cover carrier 13 and a rear cover carrier 14. Cover carriers 13 and 14 are coupled to a front carriage 15 or to a rear carriage 16, both of which are guided to move in the vehicle's lengthwise direction in a longitudinal guide mechanism 17 which is fixed on a stationary part of the roof. In doing so, a drive cable 18, preferably a threaded cable, acts on the right and left rear carriage 16, respectively. Drive cables 18 interact with a driving pinion 20 (FIG. 4) of a drive device designated overall by 21.

Driving pinion 20 is driven by an electric motor 22 via a reduction gear 23. Reduction gear 23 comprises a worm-gear shaft 24, preferably driven directly by motor 22, and a worm wheel 25 that meshes with the worm-gear shaft 24. In the embodiment illustrated, worm wheel 25 is connected to a drive shaft 26 so as to rotate with the shaft, and the shaft 26, in turn, is connected to driving pinion 20. Shaft 26 is mounted to rotate in a transmission housing 29 via bearing bushes 27 and 28. Housing 29 is formed of a pot-shaped transmission housing part 30 and a cover-shaped transmission housing part 31.

In the motor power supply circuit (which is not illustrated detail), in a known way, there is a switching device 32 with two switches 33 and 34, that are arranged above one another. The operating elements of the switches 33, 34 are indicated at 35, 36 and interact with a respective one of two cam tracks 37, 38, that are mutually offset in the axial direction and that are located on the outer periphery of a switch wheel formed by cam wheel 39, to automatically stop cover 10 once it reaches one end position or the other (FIGS. 1 and 2).

During a transition of cover 10 from the one end position to the other, worm wheel 25 performs several revolutions. The respective rotary position of worm wheel 25 is, thus, unsuitable for clearly determining the cover position. To obtain such a clear correlation, between worm wheel 25 or shaft 26 and cam wheel 39, there is provided an eccentric gear train (designated overall by 40) that is made so that cam wheel 39, in the course of movement of cover 10 from the one end position to the other, is caused to make a rotation of less than 360°.

The eccentric gear train includes 40 includes the shaft 26, an eccentric disk 42, an internal body external gear 43 and an external body internal gear 44. Eccentric disk 42 is connected so as to rotate with worm wheel 25 and shaft 26; in the embodiment illustrated according to FIG. 4, eccentric disk 42 being formed on worm wheel 25 as part thereof. Annular internal body external gear 43 is mounted to rotate on eccentric disk 42. External body internal gear 44 is connected to cam wheel 39 so as to rotate with it, and in the embodiment illustrated, external gear 44 simultaneously forms cam wheel 39. External gear 44 is mounted to rotate on shaft 26 and is provided with an internal toothing 45 that is coaxial to shaft 26. Internal body external gear 43 has an external toothing 46 that meshes with internal toothing 45 and whose number of teeth is at least one, and preferably exactly one, less than the number of teeth of internal toothing 45 of external body external gear 44. Furthermore, preferably, the internal and external gears are made of materials with at least approximately equal coefficients of thermal expansion. This guarantees a perfect operation of the drive device within an especially wide temperature range.

A guide bolt 47 projects parallel to shaft 26 from the outside of transmission housing part 31 into a radial recess 48, which extends radially inwardly of toothing 46 of internal gear 43. Guide bolt 47 is guided to move in this recess 48. In this way, internal body internal gear 43 is prevented from rotating with external body internal gear 44; but, it can perform a back-and-forth movement along an adjusting axis 49 (FIG. 3) that is normal to axis 50 (FIG. 4) of shaft 26 in the embodiment illustrated, without this orientation representing an indispensable condition. When transmission housing part 31 is formed of a cast part, guide bolt 47 is preferably an integrally cast portion of this cast part.

When motor 22 is turned on during operation and thus, eccentric disk is caused to rotate around axis 50, internal body external gear 43 performs a back-and-forth movement along adjusting axis 49, on which a wobbling movement around guide bolt 47 is superimposed. In this way, external body internal gear 44 forming cam wheel 39 is caused to make a rotational movement about axis 50 that is reduced relative to the rotational movement of worm wheel 25 in a ratio that is a function of the number of teeth in toothings 46 and 45 of internal body external gear 43 and external body internal gear 44, respectively. Switches 43 and 44, preferably, are made as microswitches, which are actuated with especially low noise with great switching safety.

Figure 3:
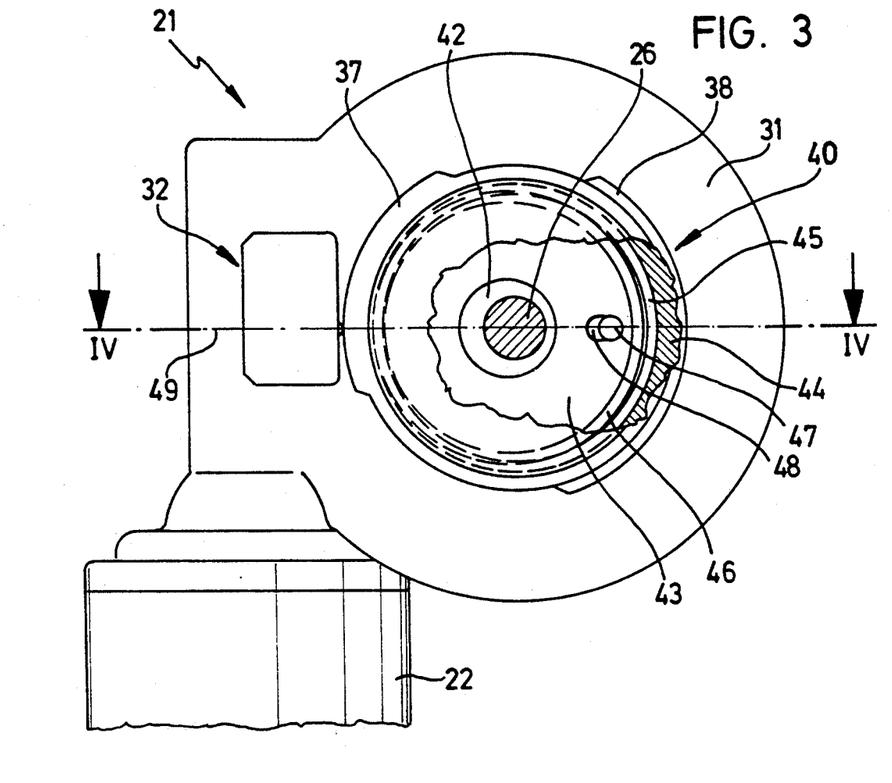
FIG. 3 is an enlarged view of the drive device of the vehicle roof of FIGS. 1 and 2 which has been broken-away along III—III of FIG. 4, seen from below.
Figure 4:
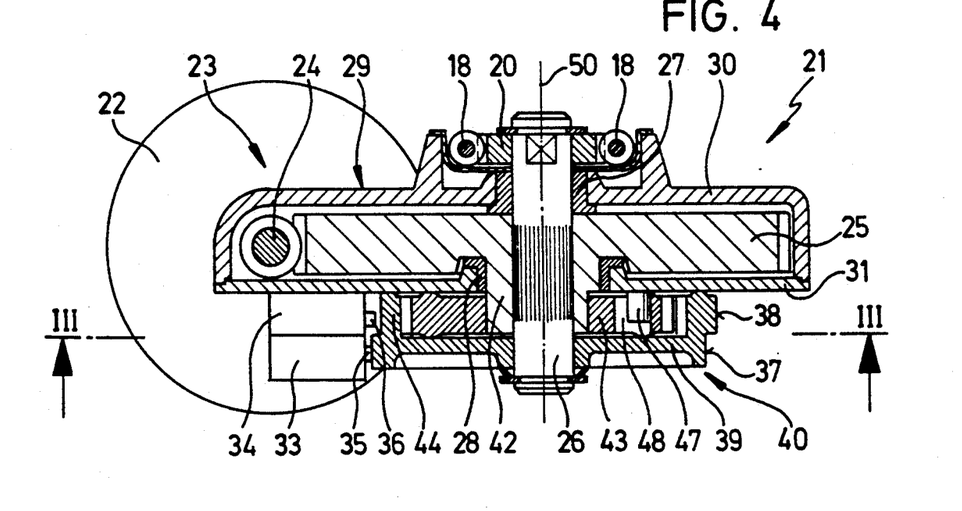
FIG. 4 is a sectional view of the drive device taken along line IV—IV of FIG. 3.
Figure 5:
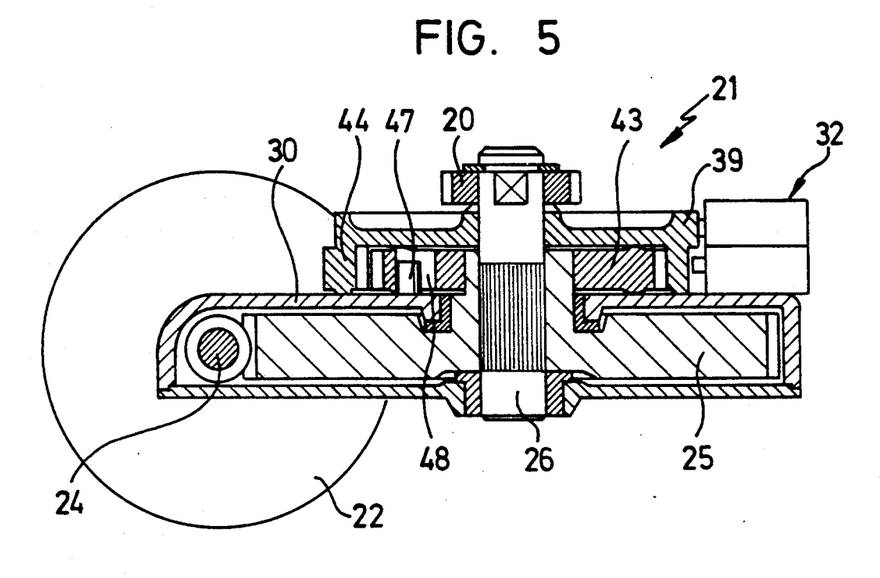
FIG. 5 is a sectional view similar to FIG. 4 of a modified embodiment of the drive device.

While in the embodiment according to FIGS. 3 and 4 eccentric gear train 40 is placed on the side of worm wheel 25 facing away from driving pinion 20, in the modified embodiment according to FIG. 5, eccentric gear train 40 is located in the axial direction between driving pinion 20 and worm wheel 25. Consequently, guide bolt 47 is attached to transmission housing part 30, for example, is cast integral with it.

Figure 6:
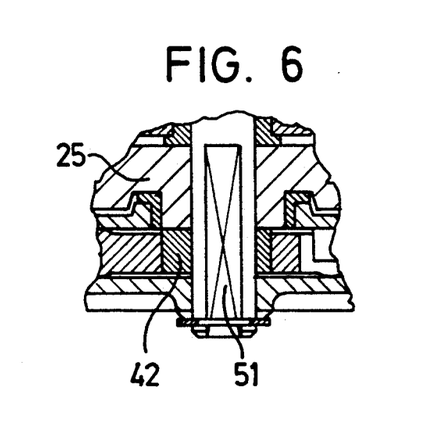
FIG. 6 is a partial sectional view of a further modified embodiment of the drive device.
Figure 7:
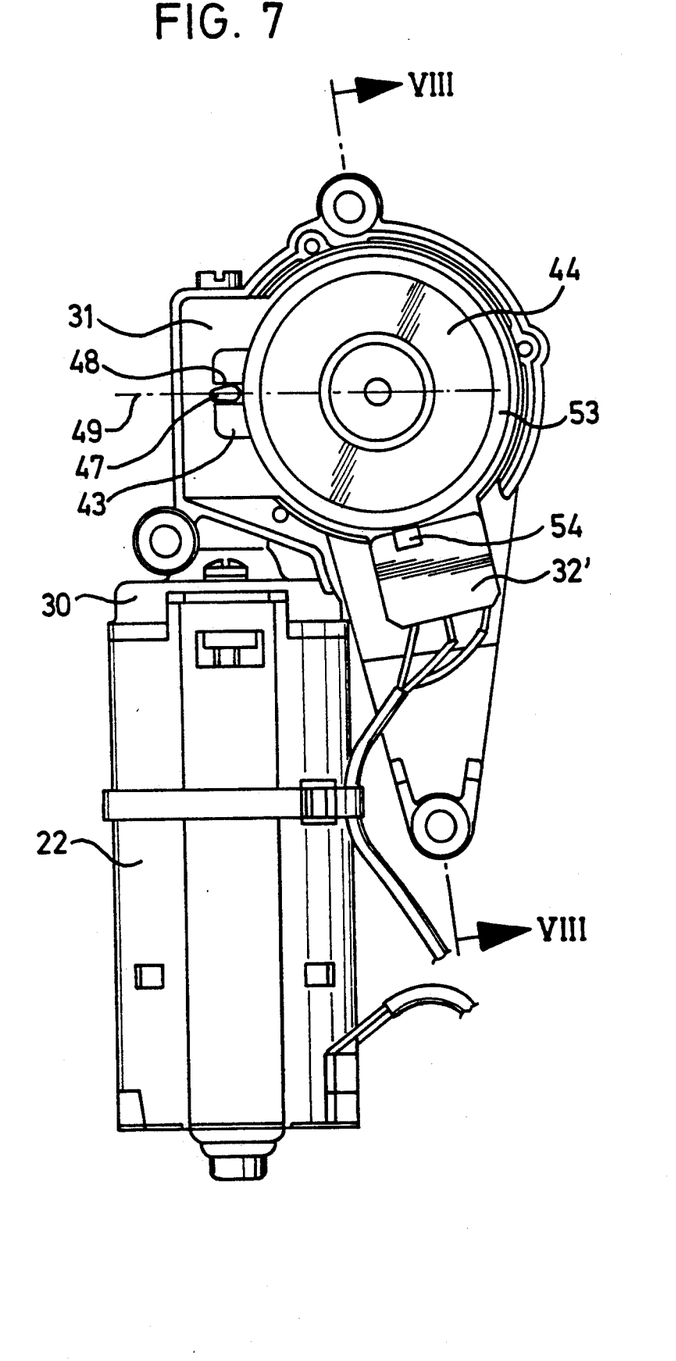
FIG. 7 is a top view of a further modified embodiment of the device.
Figure 8:
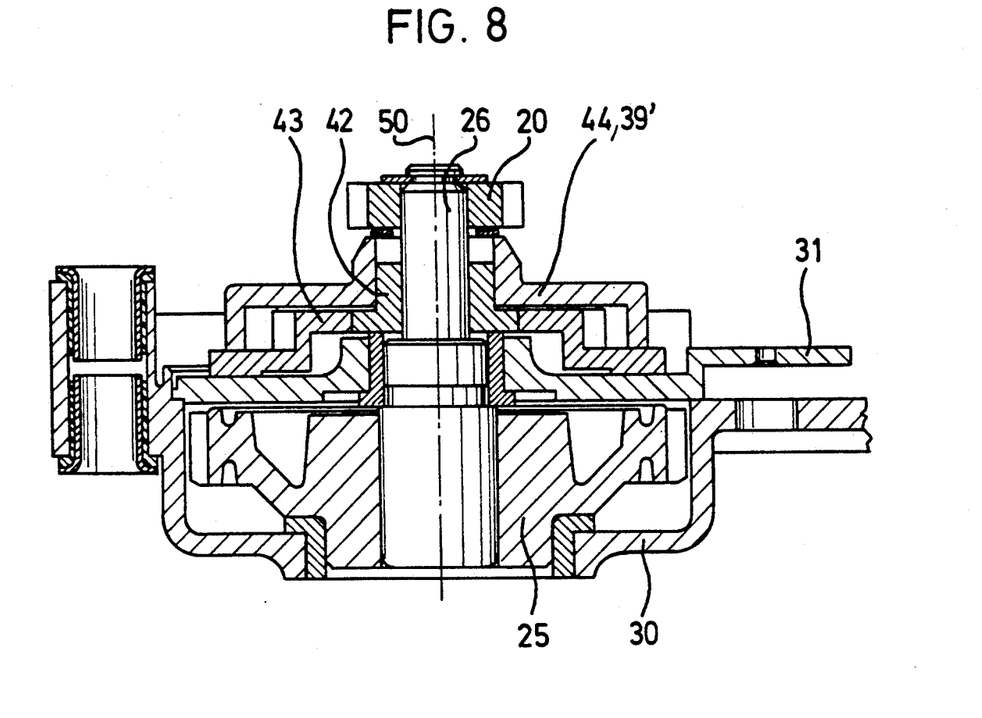
FIG. 8 is a sectional view taken along line VIII—VIII of FIG. 7.
Figure 9:
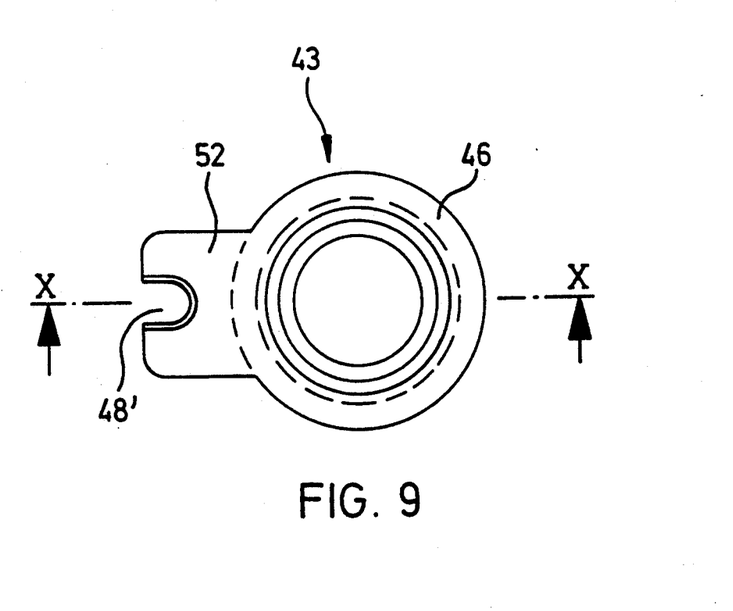
FIG. 9 is a top view of the internal gear of the arrangement the drive device of FIGS. 7 and 8.
Figure 10:
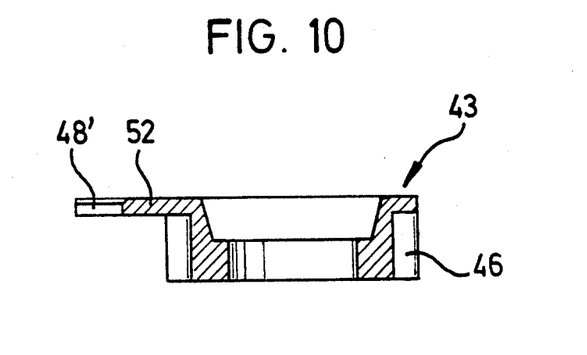
FIG. 10 is a sectional view of the internal gear taken along X—X of FIG. 9.

FIG. 6 shows an embodiment corresponding to that of FIGS. 3 and 4, but where eccentric disk 42 is made as a separate component from worm wheel 25. Worm wheel 25 and eccentric disk 42, here, are connected to drive shaft 26 by a wedge or spline 51 so as to rotate with shaft 26.

Other modifications are possible in the framework of the invention. For example, guide bolt 47 and radial recess 48 can be switched so that guide bolt 47 is integrally connected to internal body external gear 43 and radial recess 48 is made in transmission housing part 31 (FIG. 4) or 30 (FIG. 5). Cam wheel 39 can, optionally, be equipped with other cam tracks that interact with additional switches of switching device 32. It is not necessary, either, to place switches 33, 34 of switching device 32 above one another, as represented in FIGS. 3, 4 and 5, rather they can be located at a distance from one another in the circumferential direction of cam wheel 39.

In the modified embodiment according to FIGS. 7 to 10, radial recess 48' is located, not radially within external toothing 46, but radially outside it, as a radially outwardly open slot. For this purpose, internal body external gear 43 is formed as one piece with a part 52 that has a radial recess 48' and projects radially outward beyond external body internal toothing 46. External gear 44, itself, forms switch wheel 39' of eccentric gear train 40, and carries at least one permanent magnet 53, for example in the form of a magnet ring. Magnet 53 interacts with at least one magnetic sensor that is sensitive to a magnetic field, in particular a Hall sensor, to actuate switching device 32' in the predetermined angular position of switch wheel 39'. To detect several angular positions, suitably, several magnets and subordinate Hall sensors can be provided.

Figure 11:
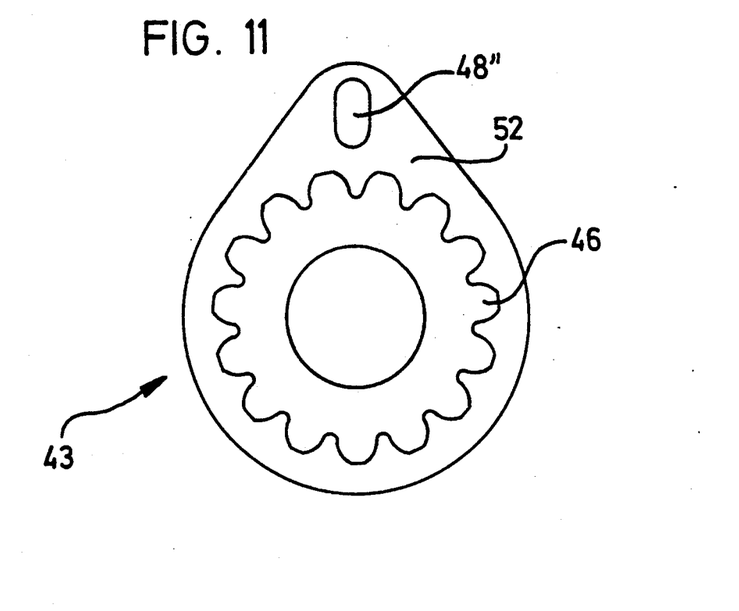
FIG. 11 is a top view of a further modified embodiment of the internal gear.

Also, in the case of the embodiment of FIG. 11, a part 52 that projects radially outward beyond external toothing 46 is connected in one piece to internal gear 43. Radial recess 48'', in the form of an oblong hole, is made in this part 52 radially outside external toothing 46.

While the invention has been explained based on a vehicle sliding roof, the drive device is also suited for lifting roofs, sliding-lifting roof, spoiler roofs, ventilation roofs, segmental arch roofs and the like. Additionally, the drive device can also be used in combination with window openers, seats, or other movable vehicle parts. Thus, the invention should not be considered to be limited to the specific embodiments disclosed above, and instead is intended to encompass the full scope of the appended claims.

We claim:

1. Drive device for displacing a vehicle part between end positions, comprising an electric motor that is connected by a reduction gear to a driving pinion located on a drive shaft, the driving pinion being connected to the vehicle part so as to drive it, a switching device controlling the motor to stop the motor in at least one predetermined position of the vehicle part, a switch wheel for actuating the switching device, and an eccentric gear train which, during displacement of the vehicle part between its end positions, causes the switch wheel to rotate less than 360°, the eccentric gear train having an external body internal gear with an internal toothing which is coaxial to a common shaft of the reduction gear and eccentric gear train, an eccentric disk that is connected to the common shaft for rotation therewith, and an internal body external gear that has an external toothing which is meshed with the eccentric gear train and has at least one tooth less than the external body internal gear, the internal body external gear being supported on the eccentric disk and being rotatable with the eccentric disk; wherein the internal body external gear is prevented from rotating with the external body internal gear and is guided by a single stationary guide bolt for movement back and forth along an adjusting axis that intersects the axis of the common shaft while wobbling about said stationary guide bolt, said guide bolt engaging in a radial recess of the internal body external gear; and wherein the external body internal gear is connected to the switch wheel for rotation therewith.

2. Drive device according to claim 1, wherein the external gear, itself, forms the switch wheel.

3. Drive device according to claim 1, wherein a radially extending recess is provided inwardly of the external toothing of the internal body external gear.

4. Drive device according to claim 1, wherein the radial recess is made in a part of the internal body external gear that projects radially outward beyond the external toothing of the internal gear.

5. Drive device according to claim 4, wherein the radial recess is made as an oblong hole.

6. Drive device according to claim 4, wherein radial recess is made as a radially outwardly open slot.

7. Drive device according to claim 1, wherein the number of teeth of the external body internal gear is precisely one more than the number of teeth of the internal gear.

8. Drive device according to claim 1, wherein the guide bolt is attached to a transmission housing part.

9. Drive device according to claim 8, wherein the transmission housing part is a cast part with which the guide bolt is integrally cast.

10. Drive device according to claim 1, wherein the reduction gear has a worm-gear shaft driven by the motor and a worm wheel that meshes with the worm-gear shaft, the worm gear being located on said common shaft and being connected to the common shaft for rotation therewith.

11. Drive device for displacing a vehicle part between end positions, comprising an electric motor that is connected by a reduction gear to a driving pinion located on a drive shaft, the driving pinion being connected to the vehicle part so as to drive it, a switching device controlling the motor to stop the motor in at least one predetermined position of the vehicle part, a switch wheel for actuating the switching device, and an eccentric gear train which, during displacement of the vehicle part between its end positions, causes the switch wheel to rotate less than 360°, the eccentric gear train having an external body internal gear with an internal toothing which is coaxial to a common shaft of the reduction gear and eccentric gear train, an eccentric disk that is connected to the common shaft for rotatin therewith, and an internal body external gear that has an external toothing which is meshed with the eccentric gear train and has at least one tooth less than the external body internal gear, the internal body external gear being supported on the eccentric disk and being rotatable with the eccentric disk; wherein the internal body external gear is prevented from rotating with to the external body internal gear and is guided by a single stationary guide bolt for movement back and forth along an adjusting axis that intersects the axis of the common shaft; and wherein the external body internal gear is connected to the switch wheel for rotation therewith wherein the reduction gear has a worm-gear shaft driven by the motor and a worm wheel that meshes with the worm-gear shaft, the worm gear being located on said common shaft and being connected to the common shaft for rotation therewith; and wherein the eccentric disk and the worm wheel are formed in one piece with each other.

12. Drive device according to claim 1, wherein the common shaft also forms the drive shaft on which the driving pinion is located.

13. Drive device according to claim 1, wherein the switch wheel is a cam wheel.

14. Drive device according to claim 13, wherein the cam wheel is provided with several cam tracks that are offset relative to one another in the axial direction, each of said cam tracks interacting with a respective switch of the switching device.

15. Drive device according to claim 1, wherein the switch wheel carries at least one permanent magnet that interacts with at least one sensor that is sensitive to a magnetic field for actuating the switching device.

16. Drive device according to claim 1, wherein the internal body external gear and the external body internal gear are made of materials with at least approximately equal coefficients of thermal expansion.

17. Drive device according to claim 1, wherein a cover of a vehicle roof is displaceable by the drive device between said end positions.

18. Drive device according to claim 17, wherein at least one stationary guide bolt is provided for guiding the internal body external gear, said guide bolt movably engaging in a radial recess of the internal body external gear.

19. Drive device according to claim 18, wherein the reduction gear has a worm-gear shaft driven by the motor and a worm wheel that meshes with the worm-gear shaft, the worm gear being located on said common shaft and being connected to the common shaft for rotation therewith.

20. Drive device according to claim 1, wherein said adjusting axis is normal to the axis of the common shaft.

* * * * *